United States Patent
Takahashi et al.

(10) Patent No.: US 12,088,478 B2
(45) Date of Patent: Sep. 10, 2024

(54) PRODUCTION ASSISTING DEVICE, PRODUCTION SYSTEM, AND RECORDING MEDIUM

(71) Applicant: Mitsubishi Electric Corporation, Tokyo (JP)

(72) Inventors: Masaya Takahashi, Tokyo (JP); Yoshihiro Takamatsu, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 347 days.

(21) Appl. No.: 17/613,090

(22) PCT Filed: Jul. 25, 2019

(86) PCT No.: PCT/JP2019/029229
§ 371 (c)(1),
(2) Date: Nov. 22, 2021

(87) PCT Pub. No.: WO2021/014646
PCT Pub. Date: Jan. 28, 2021

(65) Prior Publication Data
US 2022/0236723 A1   Jul. 28, 2022

(51) Int. Cl.
*H04L 41/22*   (2022.01)
*G05B 19/418*   (2006.01)
(Continued)

(52) U.S. Cl.
CPC ........ *H04L 41/22* (2013.01); *G05B 19/41865* (2013.01); *G06F 3/0484* (2013.01);
(Continued)

(58) Field of Classification Search
CPC ..... G06F 3/0484; G06F 3/1204; H04L 41/22; H04L 67/12; G05B 19/042; G05B 19/05;
(Continued)

(56) References Cited

U.S. PATENT DOCUMENTS

2006/0253838 A1   11/2006   Fujii
2006/0282506 A1   12/2006   Furuishi et al.
(Continued)

FOREIGN PATENT DOCUMENTS

CN   102365594 A   2/2012
CN   105637438 A   6/2016
(Continued)

OTHER PUBLICATIONS

Office Action dated Jul. 13, 2022, in corresponding Chinese patent Application No. 201980098647.3, 14 pages.
(Continued)

*Primary Examiner* — Mong-Shune Chung
(74) *Attorney, Agent, or Firm* — XSENSUS LLP

(57) ABSTRACT

A terminal (100) includes a start assist tool (120) that classifies, into multiple groups, multiple remote modules (400) including channels (CH) connected to production line devices (500) as control targets, sets, based on information about the groups, an operation mode of a remote module belonging to a specific group of the multiple groups to a first operation mode to perform operational checks, and forms an image to display an operation of the remote module belonging to a first group.

17 Claims, 14 Drawing Sheets

(51) Int. Cl.
*G06F 3/0484* (2022.01)
*H04L 41/40* (2022.01)
*H04L 67/12* (2022.01)

(52) U.S. Cl.
CPC .............. *H04L 41/40* (2022.05); *H04L 67/12* (2013.01); *G05B 2219/32015* (2013.01)

(58) Field of Classification Search
CPC G05B 19/054; G05B 19/058; G05B 19/0428; B25J 9/00
See application file for complete search history.

(56) References Cited

U.S. PATENT DOCUMENTS

| | | |
|---|---|---|
| 2011/0301719 A1 | 12/2011 | Kuroda |
| 2013/0176106 A1* | 7/2013 | Schultz .................... G05B 1/01 340/5.52 |
| 2015/0039099 A1 | 2/2015 | Mizutani |
| 2015/0199245 A1 | 7/2015 | Goto et al. |
| 2016/0124412 A1 | 5/2016 | Fujita |
| 2016/0134475 A1 | 5/2016 | Masada |
| 2016/0231730 A1 | 8/2016 | Wakana |
| 2016/0269487 A1 | 9/2016 | Abe |
| 2017/0246741 A1 | 8/2017 | Kobayashi et al. |
| 2018/0196410 A1 | 7/2018 | Kitamura et al. |
| 2020/0088794 A1* | 3/2020 | Nakanishi ........... G06F 11/3051 |
| 2020/0089181 A1 | 3/2020 | Ueda et al. |
| 2020/0225725 A1* | 7/2020 | Nagabhairava ....... G06F 16/287 |

FOREIGN PATENT DOCUMENTS

| | | |
|---|---|---|
| EP | 3282332 A1 | 2/2018 |
| JP | 6-124103 A | 5/1994 |
| JP | 2001-325010 A | 11/2001 |
| JP | 2004-30345 A | 1/2004 |
| JP | 2005-269879 A | 9/2005 |
| JP | 2006-259938 A | 9/2006 |
| JP | 2007-20150 A | 1/2007 |
| JP | 2007-95107 A | 4/2007 |
| JP | 2008-146385 A | 6/2008 |
| JP | 2008-210090 A | 9/2008 |
| JP | 2015-133002 A | 7/2015 |
| JP | 2016-92544 A | 5/2016 |
| JP | 2017-167595 A | 9/2017 |
| JP | 2017-192301 A | 10/2017 |
| JP | 2018-120558 A | 8/2018 |
| WO | 2013/136913 A1 | 9/2013 |
| WO | 2015/162754 A1 | 10/2015 |
| WO | 2016/051573 A1 | 4/2016 |
| WO | 2017/135247 A1 | 8/2017 |
| WO | 2020/079730 A1 | 4/2020 |

OTHER PUBLICATIONS

Office Action dated Jan. 19, 2023 in the corresponding Chinese Patent Application No. 201980098647.3 and the partial English translation thereof, 13 pages.
International Search Report and Written Opinion dated Oct. 21, 2019, received for PCT Application PCT/JP2019/029229, Filed on Jul. 25, 2019, 8 pages including English Translation.
Decision to Grant dated May 26, 2020, received for JP Application 2020-506367, 5 pages including English Translation.

* cited by examiner

GROUP SETTING INFORMATION

| REMOTE MODULE ADDRESS | NAME OF TYPE | GROUP |
|---|---|---|
| 1 | REMOTE MODULE A | I |
| 2 | REMOTE MODULE B | II |
| 3 | REMOTE MODULE C | I |
| 4 | REMOTE MODULE D | II |

OPERATION-MODE SETTING INFORMATION

| GROUP | OPERATION MODE |
|---|---|
| I | START ASSISTING MODE |
| II | NORMAL MODE |

STATE DIAGRAM

FIG.15

CHANNEL ALLOCATION INFORMATION

| VIRTUAL MODULE | | ACTUAL REMOTE MODULE | | | |
|---|---|---|---|---|---|
| CH | INPUT/OUTPUT INFORMATION | NAME OF TYPE | CH | REMOTE MODULE ADDRESS | REPRESENTATIVE MODULE |
| CH1 | OUTPUT | REMOTE MODULE A | CH1 | 1 | ○ |
| CH2 | OUTPUT | REMOTE MODULE A | CH2 | 1 | — |
| CH3 | OUTPUT | REMOTE MODULE A | CH3 | 1 | — |
| CH4 | OUTPUT | REMOTE MODULE A | CH4 | 1 | — |
| CH5 | OUTPUT | REMOTE MODULE C | CH1 | 3 | — |
| CH6 | OUTPUT | REMOTE MODULE C | CH2 | 3 | — |
| CH7 | OUTPUT | REMOTE MODULE C | CH3 | 3 | — |
| CH8 | OUTPUT | REMOTE MODULE C | CH4 | 3 | — |

FIG.16

DATA RECEPTION INFORMATION

| DATA RECEIVED FROM MASTER MODULE | TRANSFER DATA IN VIRTUAL MODULE | |
|---|---|---|
| | REMOTE MODULE ADDRESS | RECEIVED DATA |
| VOLTAGE VALUE OUTPUT FROM CH1 | 1 | VOLTAGE VALUE OUTPUT FROM CH1 |
| VOLTAGE VALUE OUTPUT FROM CH5 | 3 | VOLTAGE VALUE OUTPUT FROM CH1 |

FIG.17

DATA TRANSMISSION INFORMATION

| DATA TRANSMITTED TO MASTER MODULE | ACQUIRED DATA IN VIRTUAL MODULE | |
|---|---|---|
| | REMOTE MODULE ADDRESS | TRANSMITTED DATA |
| ERROR CODE | 1 | ERROR CODE |
| | 3 | ERROR CODE |
| VOLTAGE VALUE INPUT FROM CH1 | 1 | VOLTAGE VALUE INPUT FROM CH1 |
| VOLTAGE VALUE INPUT FROM CH5 | 3 | VOLTAGE VALUE INPUT FROM CH1 |

PRODUCTION ASSISTING DEVICE, PRODUCTION SYSTEM, AND RECORDING MEDIUM

CROSS-REFERENCE TO RELATED APPLICATION

The present application is based on PCT filing PCT/JP2019/029229, filed Jul. 25, 2019, the entire contents of which are incorporated herein by reference.

TECHNICAL FIELD

The present disclosure relates to a production assisting device, a production system, and a program.

BACKGROUND ART

In a factory production line, a production line device is controlled with a programmable logic controller (PLC) module. In a system including the PLC module, input or output of data to or from a remote module through a communication network is performed in accordance with a control program executed by a central processing unit (CPU) module. The CPU module inputs and outputs data to and from the remote module to control a sensor and a motor connected to each channel in the remote module. A typical system includes distributed remote modules, to and from which data is input and output individually (see, for example, Patent Literature 1).

CITATION LIST

Patent Literature

Patent Literature 1: International Publication No. WO 2015/162754

SUMMARY OF INVENTION

Technical Problem

At the start or change in a production line, the operation of each remote module is to be checked one after another. For such operational checks, a production-line start company such as a system integrator creates, using an engineering tool, a control program for monitoring the operation of each remote module one after another by reading input and output values from the remote module, or a control program for collectively monitoring the operations of the multiple remote modules. When the control program for monitoring the operation of each remote module one after another is executed by the CPU module, the input and output values of each remote module are individually read and displayed on a display screen, to enable checking the operation of each remote module individually. For example, inclusion of ten remote modules leads to performing ten times of a work that includes reading the input and output values of each remote module, displaying the input and output values on the display screen, and individually checking the operation of each remote module. The control program for collectively monitoring the operations of the ten remote modules is complex, and creating such a control program takes a long time. Starting such a production line thus takes a long time.

In response to the above issue, an objective of the present disclosure is to simplify a work to start or change a production line.

Solution to Problem

To achieve the above objective, a production assisting device according to an aspect of the present discourse includes (i) information collection means for collecting, from a plurality of remote modules each at least to input or output a signal through channels connected to control target devices, module identification information for classification of the plurality of remote modules into a plurality of groups, (ii) group setting means for setting the plurality of groups using the module identification information collected by the information collection means, (iii) operation mode setting means for setting, for each of the plurality of groups, an operation mode of a remote module belonging to the group, and setting, for at least one group of the plurality of groups, an operation mode of a remote module belonging to the at least one group to a first operation mode for checking an operation of the remote module belonging to the at least one group, and (iv) display image forming means for forming an image displaying, for each of the plurality of groups, information about the remote module belonging to the group, the image displaying the operation of the remote module belonging to the at least one group and set to the first operation mode.

Advantageous Effects of Invention

In the above aspect of the present disclosure, the information collection means collects module identification information from the remote modules, and groups are set with the module identification information. The operation mode setting means sets the operation mode of remote modules belonging to the at least one group to a first operation mode. The display image forming means forms an image displaying the operation of the remote modules belonging to the at least one group set to the first operation mode. Thus, the operation mode for the remote modules can be set for each group, and the operation state or the operation result of the remote modules in each group can be collectively checked. This structure can thus simplify the work to start or change a production line.

BRIEF DESCRIPTION OF DRAWINGS

FIG. 15 illustrates an example of channel allocation information according to Embodiment 2;

FIG. 16 illustrates an example of data reception information according to Embodiment 2; and FIG. 17 illustrates an example of data transmission information according to Embodiment 2.

DESCRIPTION OF EMBODIMENTS

A production assisting device and a production system according to one or more embodiments of the present disclosure are described in detail with reference to the drawings.

Embodiment 1

A production system according to the present embodiment produces products in a production line under control of a programmable logic controller (PLC).

Figure 1:
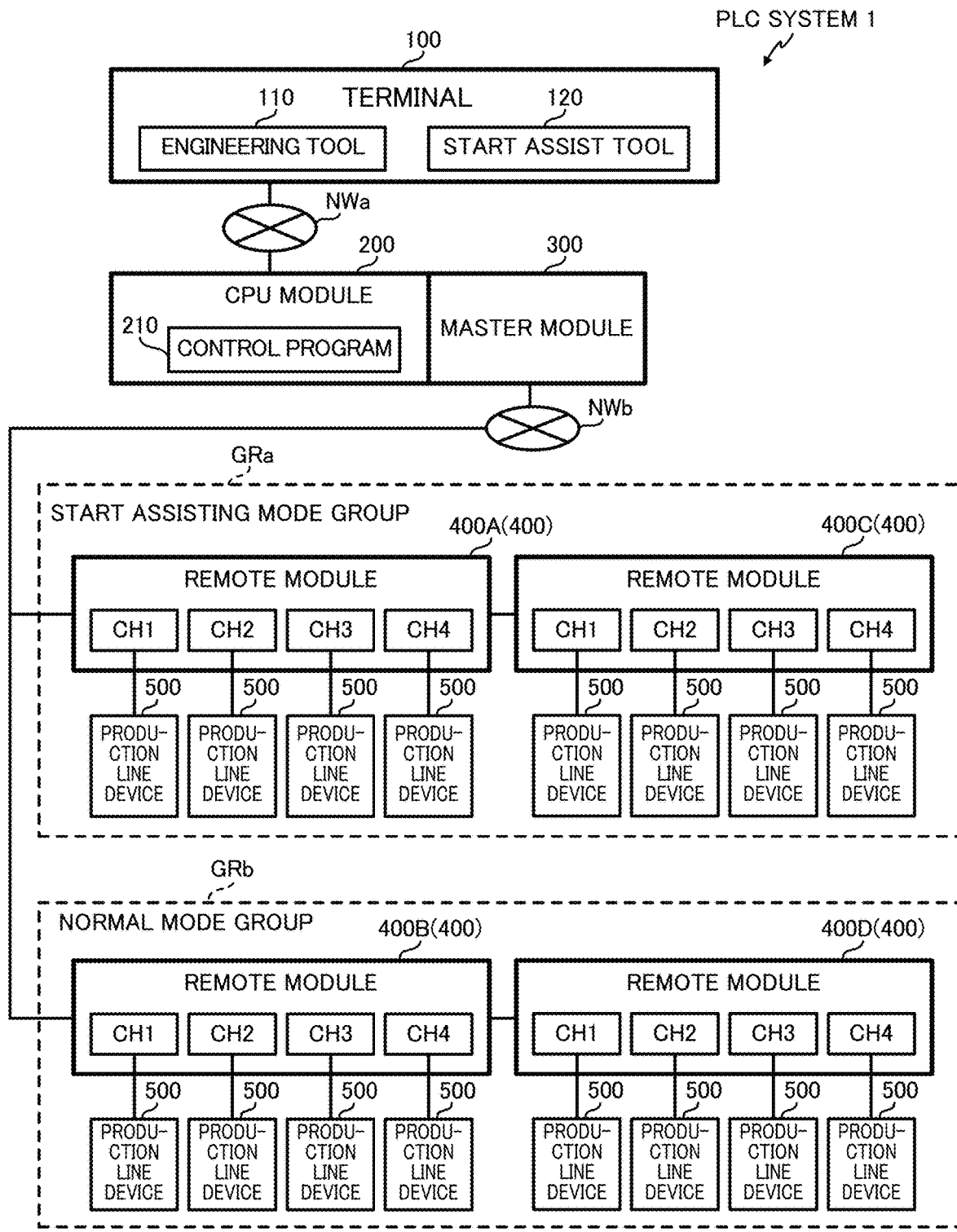
FIG. 1 illustrates configuration of a PLC system according to Embodiment 1 of the present disclosure.

As illustrated in FIG. 1, a PLC system 1 serving as a production system includes a terminal 100 that displays, sets, and updates various parameters for managing the operations of production line devices 500, a central processing unit (CPU) module 200 that executes a control program 210, a master module 300 that connects the CPU module 200 to a network, remote modules 400A to 400D that transmit and receive various types of data to and from the CPU module 200 through the master module 300 and that input and output current signals and voltage signals to and from the production line devices 500, and the production line devices 500 that perform processing and sensing for production of the products. The terminal 100 is an example of a production assisting device. The master module 300 is an example of a host device that communicates with the remote modules 400A to 400D.

The remote modules 400A to 400D are also collectively referred to as remote modules 400.

The terminal 100 includes a personal computer (PC), and serves as an engineering tool 110 or a start assist tool 120 in the PLC system 1 to provide the settings to the remote modules 400 through the CPU module 200 and the master module 300. Each remote module 400 controls channels to which the corresponding production line devices 500 are connected in accordance with the acquired settings to control the production line devices 500.

The terminal 100 and the CPU module 200 are connected with a network NWa to allow communication with each other. The CPU module 200 communicates with each remote module 400 not directly but through the master module 300. The master module 300 and each remote module 400 are connected with a network NWb to allow communication with each other. The networks NWa and NWb may be any communication network either wired or wireless, such as the Internet, a local area network (LAN), or a virtual private network (VPN).

Terminal 100

The terminal 100 assists management of the production line devices 500 including monitoring, setting, and control of the production line devices 500. The terminal 100 includes a general-purpose computer on which the engineering tool 110 and the start assist tool 120 are installed.

The engineering tool 110 specifies a remote module 400 with the operation mode set to a normal mode, and provides, to the remote module 400, various types of module parameter information defining the operation of the remote module 400 through the CPU module 200 and the master module 300. The specified remote module 400 controls channels to which the corresponding production line devices 500 are connected in accordance with the acquired settings to control the production line devices 500.

The start assist tool 120 provides, to the remote module 400 with the operation mode set to a start assisting mode, various types of module parameter information defining the operation of the remote module 400 through the CPU module 200 and the master module 300. The remote module 400 set to the start assisting mode controls the channels to which the corresponding production line devices 500 are connected in accordance with the provided settings to control the production line devices 500. The details of the terminal 100, the engineering tool 110, and the start assist tool 120 are described later.

CPU Module 200 and Master Module 300

Figure 2:
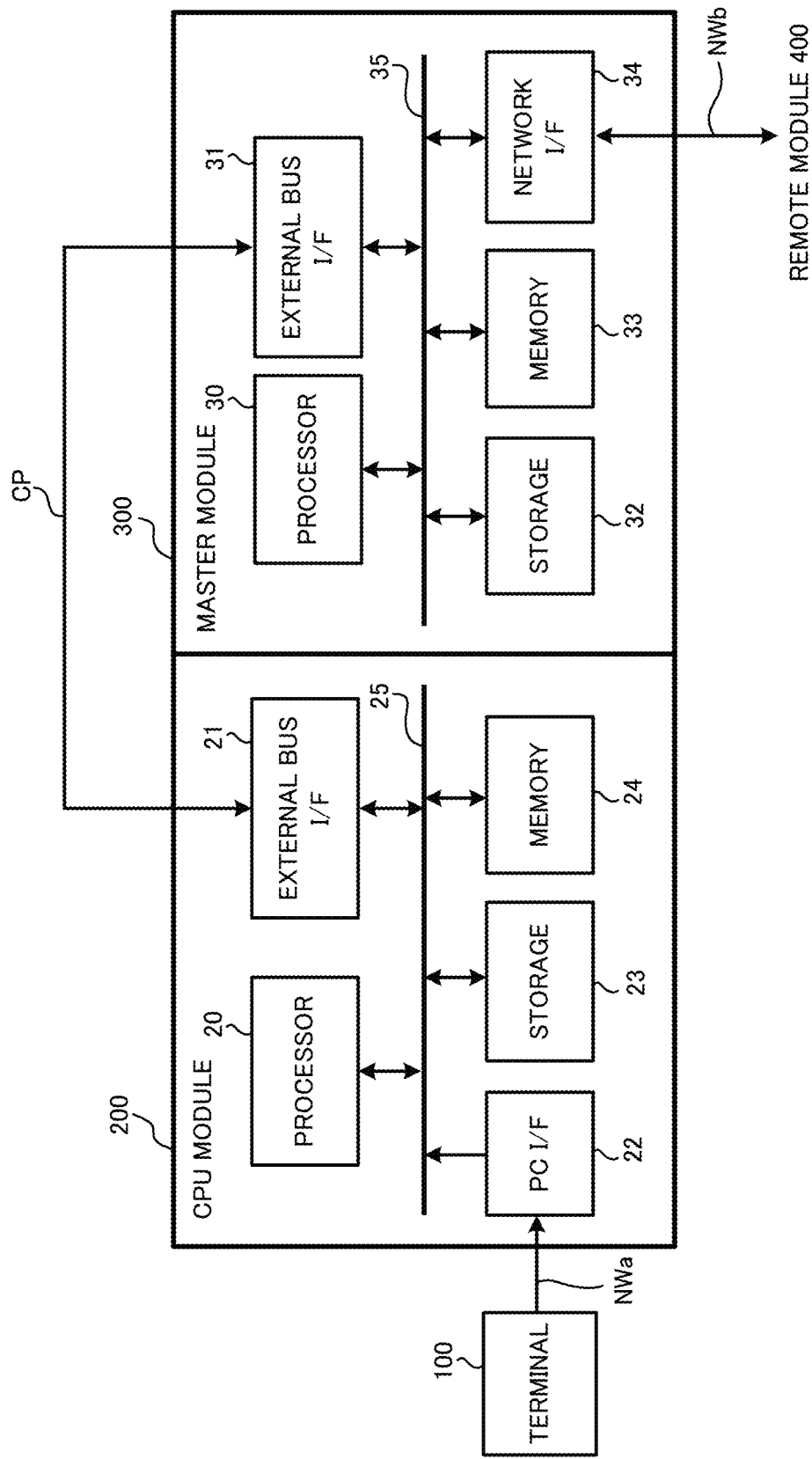
FIG. 2 illustrates configuration of a CPU module and a master module illustrated in FIG. 1.

The example configurations of the CPU module 200 and the master module 300 are described with reference to FIG. 2.

The CPU module 200 includes a processor 20, an external bus interface (external bus I/F) 21, a PC interface (PC I/F) 22, a storage 23, a memory 24, and an internal bus 25.

The processor 20 executes the control program 210 stored in the memory 24. The control program 210 controls the processor 20 and controls the operations of the master module 300 and the remote modules 400. The external bus I/F 21 is connected to an external bus I/F 31 (described later) of the master module 300 with a communication path CP. The CPU module 200 receives and transmits data from and to the master module 300 through the external bus I/F 21.

The terminal 100 is connected to the PC I/F 22 with the network NWa.

The storage 23 stores the control program 210 executable by the processor 20 and various types of data usable by the processor 20 to execute the control program 210. An example of the storage 23 is a non-transitory recording medium or a nonvolatile semiconductor memory such as a read-only memory (ROM).

The memory 24 reads the control program 210 stored in the storage 23 upon the CPU module 200 is activated to allow the processor 20 to execute the control program 210. An example of the memory 24 is a volatile or nonvolatile semiconductor memory such as a random-access memory (RAM). The internal bus 25 electrically connects the processor 20, the external bus I/F 21, the PC IX 22, the storage 23, and the memory 24 to each other.

Other than the capabilities dedicated to data transmission, the master module 300 has the configuration similar to the configuration of the CPU module 200. The master module 300 includes a processor 30, an external bus OF 31, a storage 32, a memory 33, a network interface (network I/F) 34, and an internal bus 35.

Other than the capabilities to enable data transmission, the processor 30, the storage 32, and the memory 33 have the functions similar to the functions of the processor 20, the storage 23, and the memory 24. The external bus I/F 31 is connected to the external bus I/F 21 of the CPU module 200 with the communication path CP. The external bus UFs 31 and 21 transmit and receive data to and from each other. The network I/F 34 is connected to each remote module 400 with the network NWb. The network I/F 34 and each remote module 400 can transmit and receive data to and from each other. The internal bus 35 electrically connects the processor 30, the external bus I/F 31, the storage 32, the memory 33, and the network I/F 34 to each other.

Remote Module 400

Again with reference to FIG. 1, each remote module 400 can change the operation mode for each group at any time by the settings of the start assist tool 120. The operation mode includes a normal mode in which the engineering tool 110 performs individual settings and individual operational checks of module parameter information 122 about the remote module 400, and a start assisting mode in which the start assist tool 120 performs collective settings and collective operational checks of module parameter information 126 about the remote module 400. Examples of the module parameter information pieces 122 and 126 include the settings of the ranges of the current or voltage input into or output from the channels in each remote module 400 and the settings of approval/refusal indicating whether analogue/digital conversion is to be performed. The start assisting mode is an example of a first operation mode for collectively checking the operation of one or more remote modules 400 belonging to each group. The normal mode is an example of a second operation mode for individually checking the operation of each remote module 400. The second operation mode is different from the first operation mode.

In FIG. 1, the remote modules 400A and 400C belong to a group GRa and operate in the start assisting mode. The remote modules 400B and 400D belong to a group GRb and operate in the normal mode. The groups GRa and GRb are examples of multiple groups into which the remote modules 400 are classified.

Production Line Devices 500

The production line devices 500 perform processing and sensing for production of the products. Each production line device 500 is connected to the corresponding channel in any of the remote modules 400 and operates under control of the remote module 400. The production line devices 500 are examples of control target devices.

Figure 3:
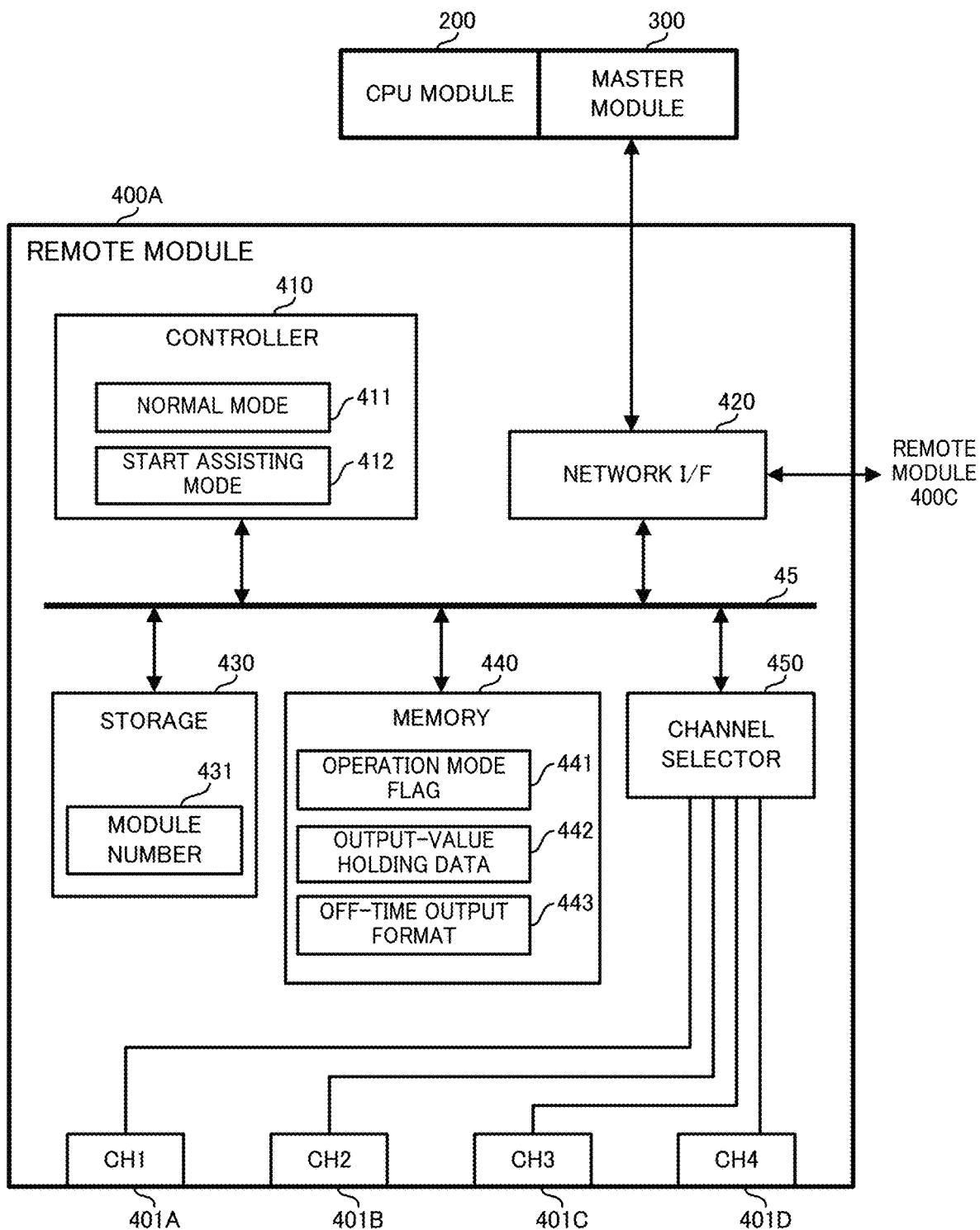
FIG. 3 illustrates configuration of a remote module illustrated in FIG. 1.

FIG. 3 is a block diagram of each remote module 400. As illustrated, each remote module 400 includes a controller 410 for executing various programs, a network I/F 420 for receiving commands from the CPU module 200 through the master module 300, a storage 430, a memory 440, a channel selector 450 for switching between channels CH, and an internal bus 45 for electrically connecting these components to each other. The remote module 400 at least inputs or outputs signals through the channels CH connected to the corresponding production line devices 500 serving as control target devices.

The controller 410 includes a processor and operates in either one of two operation modes including a normal mode 411 and a start assisting mode 412. The controller 410 determines an effective operation mode with reference to an operation mode flag 441 stored in the memory 440. The controller 410 sets the operation mode determined using the operation mode flag 441 as the operation mode of the controller 410.

The network I/F 420 receives commands and data from the CPU module 200 through the master module 300, provides the commands and data to the controller 410, receives data from the controller 410, and transmits the received data to the CPU module 200 through the master module 300.

The storage 430 includes, for example, a non-transitory recording medium or a nonvolatile semiconductor memory such as a ROM, and stores a module number 431 indicating the group to which the remote module 400 belongs. The module number 431 is prestored in each remote module 400 by an assembled-product manufacturer that prepares components and provides assembled products. The module number 431 may be changed later by the start assist tool 120. The module number 431 is an example of module identification information for classification of the multiple remote modules 400 into multiple groups.

The memory 440 includes, for example, a RAM and functions as a work area for the controller 410. The memory 440 stores the operation mode flag 441 serving as operation mode information indicating a type of the current operation mode, output-value holding data 442 to hold output values, and an off-time output format 443 indicating format data at the stop of current and voltage outputs. The output-value holding data 442 and the off-time output format 443 are examples of information stored in the memory 440 in a remote module serving as an output module.

The channel selector 450 is connected to channels CH1 to CH4. Based on an instruction from a program executed by the controller 410, the channel selector 450 selects the channel CH through which the instruction data received from the CPU module 200 to the production line device 500 is transmitted. This enables data exchange between the controller 410 and the selected channel CH. The channel selector 450 may select, based on an instruction from the CPU module 200, the channel through which the instruction data received from the CPU module 200 to the production line device 500 is transmitted.

Figure 4:
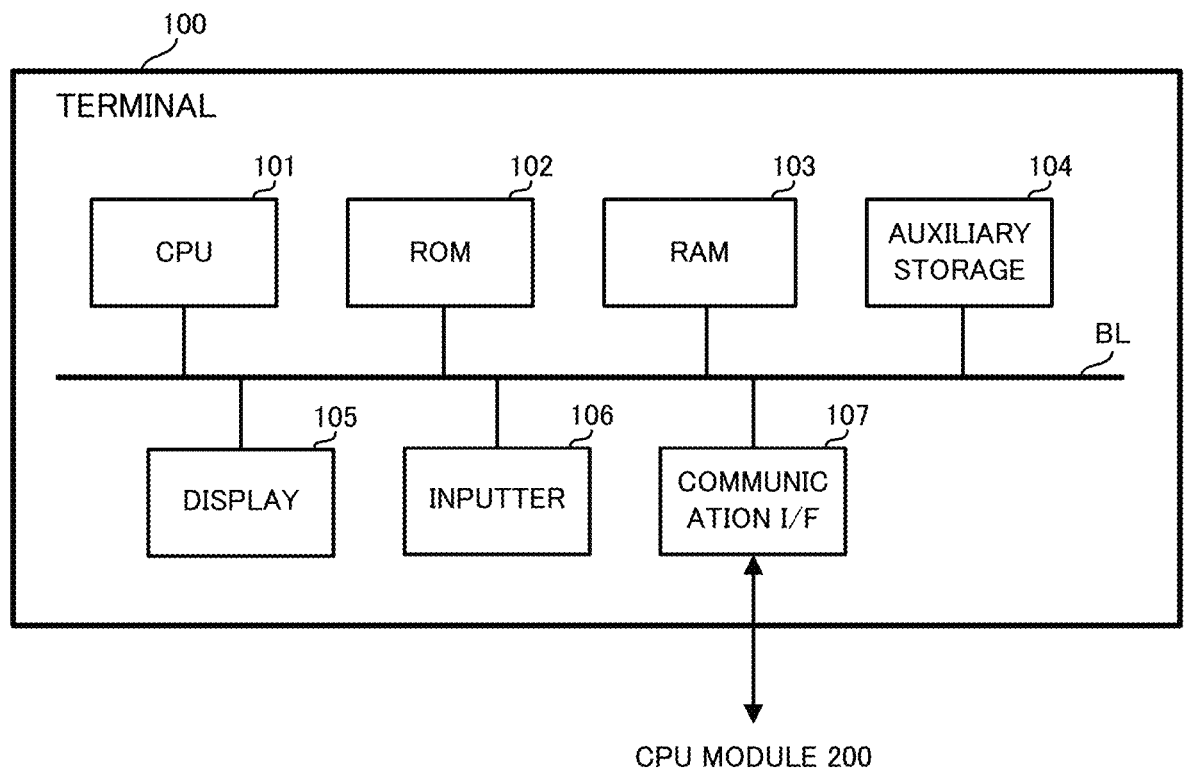
FIG. 4 illustrates hardware configuration of a terminal illustrated in FIG. 1.

The terminal 100 illustrated in FIG. 1 includes a personal computer. As illustrated in FIG. 4, the terminal 100 includes, as hardware components, a CPU 101, a ROM 102, a RAM 103, an auxiliary storage 104, a display 105, an inputter 106, a communication interface (I/F) 107, and a bus BL connecting these components to each other.

The CPU 101 reads various programs and data from the ROM 102 onto the RAM 103 to perform processing to control the entire terminal 100. The CPU 101 performs the operations of the engineering tool 110 and the start assist tool 120.

The ROM 102 stores various programs executable by the CPU 101, initial data usable to execute these programs, and fixed data such as table data. The RAM 103 functions as a work memory for the CPU 101.

The auxiliary storage 104 includes, for example, a hard disk device or a flash memory and stores various types of data. In the present embodiment, the storage area of the auxiliary storage 104 is divided into multiple partitions, and the engineering tool 110 and the start assist tool 120 store different types of information in different partitions. Instead, various types of information stored in the auxiliary storage 104 may be accessible by both the engineering tool 110 and the start assist tool 120.

The display 105 displays images based on the control of the CPU 101. The inputter 106 inputs instructions and data in accordance with the operation of a user. The communication I/F 107 communicates with the CPU module 200.

Figure 5:
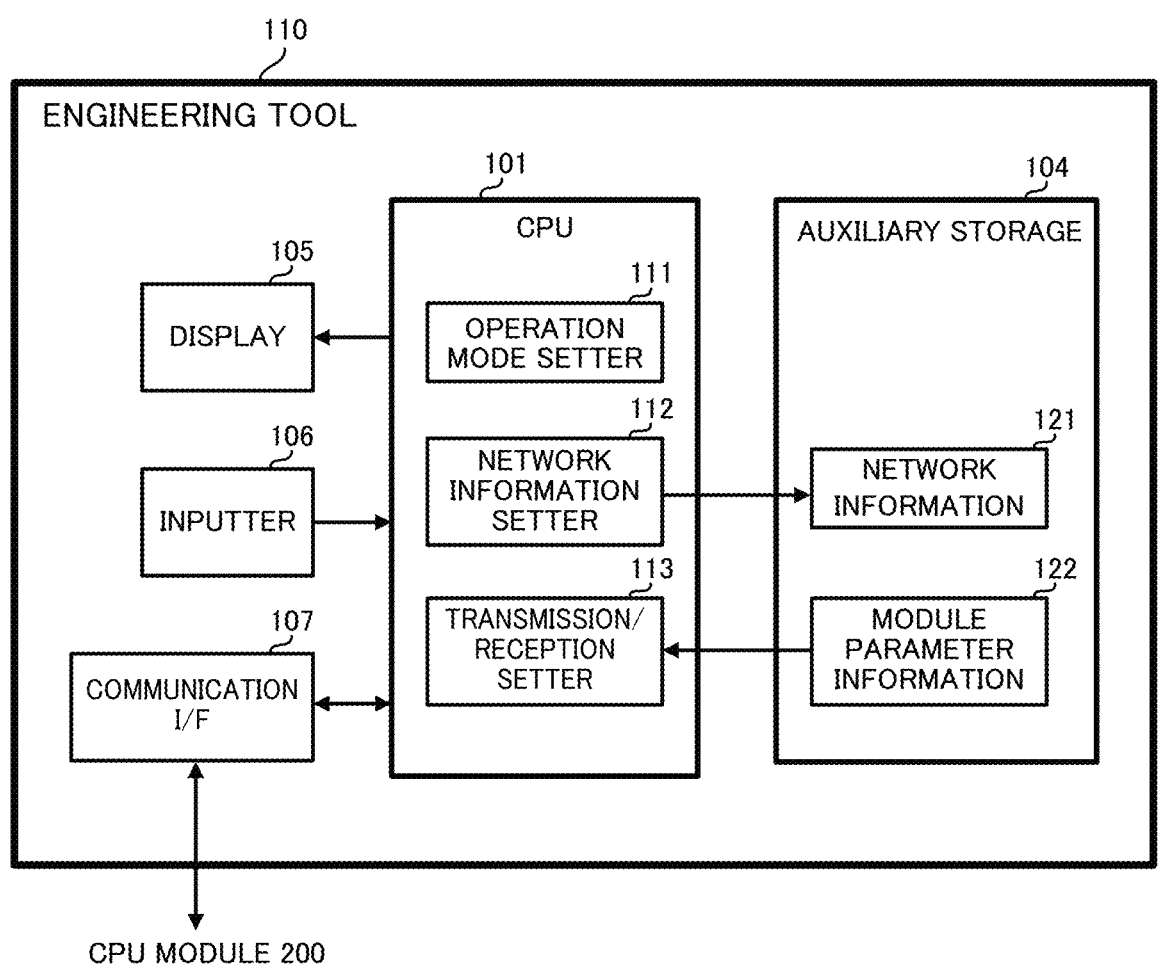
FIG. 5 illustrates functional configuration of an engineering tool installed on the terminal illustrated in FIG. 1.

As illustrated in FIG. 5, the CPU 101 loads various programs on the RAM 103 and executes the programs to function, in the engineering tool 110, as an operation mode setter 111, a network information setter 112, and a transmission/reception setter 113.

The operation mode setter 111 individually specifies each remote module 400 to set the operation mode flag 441 with the memory 440 and to set the module number 431 with the storage 430.

The network information setter 112 individually specifies each remote module 400 to set the connection relationship for the remote modules 400. To search for the connection state of each remote module 400, for example, the network information setter 112 instructs the master module 300 to broadcast an address resolution protocol (ARP) request. Thus, the network information setter 112 acquires module information identifying the remote module 400 and network information 121 indicating the connection relationship between the master module 300 and the remote module 400. For example, the network information setter 112 generates the module information about each remote module 400 and the network information 121 indicating that the remote modules 400A and 400B are connected to the master module 300 with the network NWb, that the remote module 400C is subordinate to the remote module 400A, and that the remote module 400D is subordinate to the remote module 400B, and stores the module information and the network information 121 in the auxiliary storage 104 to set the connection relationship for the remote modules 400. The network information setter 112 sets the network address of each remote module 400.

The transmission/reception setter 113 individually specifies each remote module 400 and sets module parameter information 122 about the remote module 400 stored in the auxiliary storage 104. The module parameter information 122 includes default values of various parameters of each remote module 400.

Figure 6:
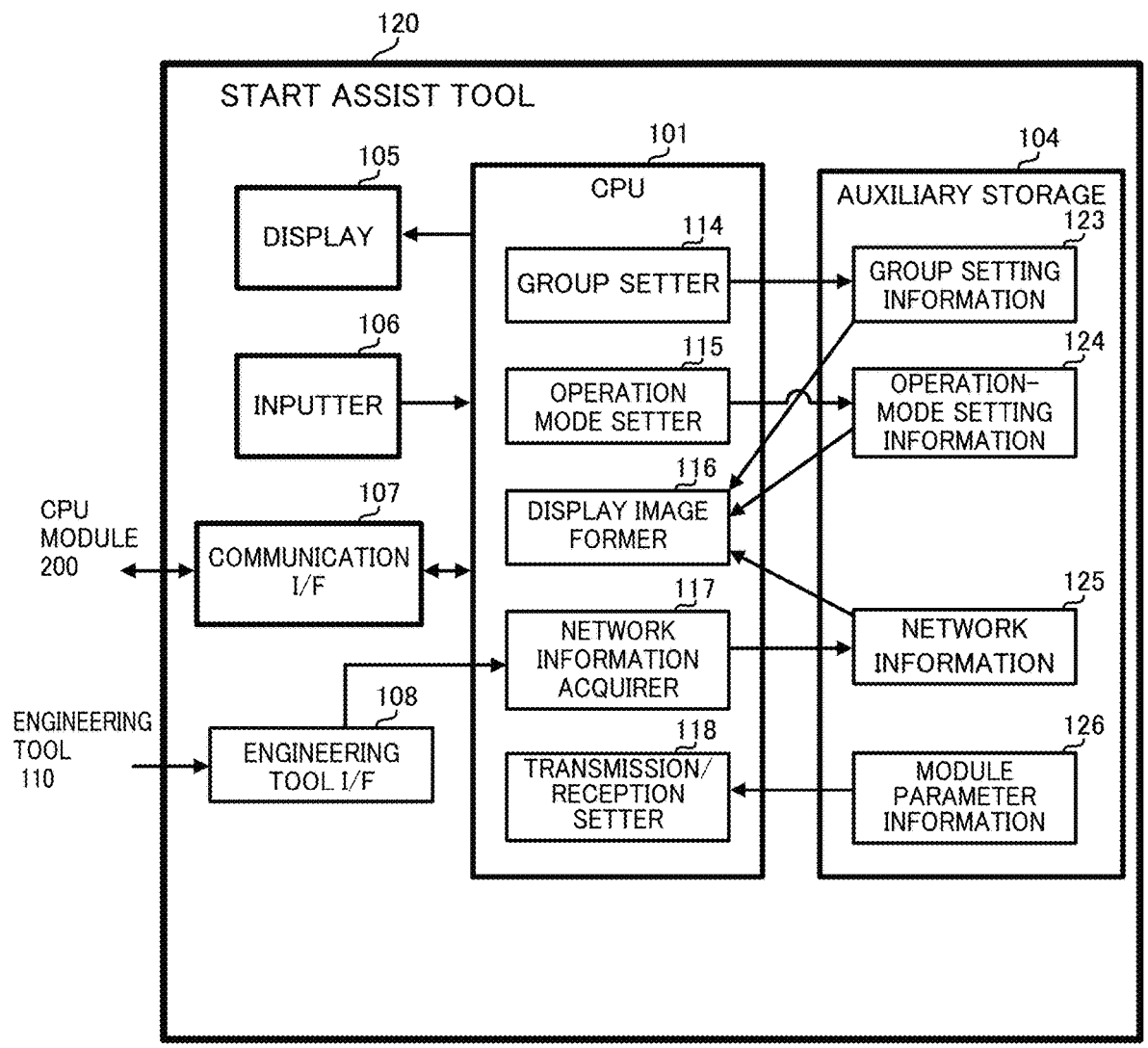
FIG. 6 illustrates functional configuration of a start assist tool installed on the terminal illustrated in FIG. 1.

As illustrated in FIG. 6, the CPU 101 loads various programs on the RAM 103 and executes the programs to function, in the start assist tool 120, as a group setter 114, an operation mode setter 115, a display image former 116, a network information acquirer 117, and a transmission/reception setter 118. The auxiliary storage 104 stores group setting information 123, operation-mode setting information 124, network information 125, and module parameter information 126.

The group setter 114 classifies the multiple remote modules 400 into multiple groups. For example, the group setter 114 transmits a transmission request signal requesting each remote module 400 to transmit the module number 431 through the CPU module 200 and the master module 300 upon receiving a user operation, acquires the module number 431 from each remote module 400 in response to the request, and updates the group setting information 123 stored in the auxiliary storage 104. At this time, the group setter 114 sets the remote modules 400 from which the same module number 431 is acquired to be in the same group. The group setter 114 is an example of information collection means and group setting means. The information collection means collects, from the multiple remote modules that each at least input or output signals through channels connected to the control target devices, module identification information for classification of the remote modules into multiple groups. The group setting means sets the multiple groups using the module identification information collected by the information collection means. The group setter 114 may be divided to separately implement the functions of collecting the module number 431 and setting the groups.

Figures 7, 8, 9:
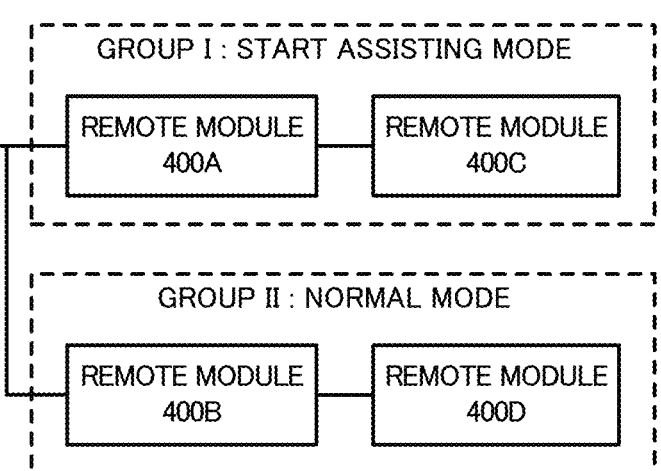
FIG. 7 illustrates an example of group setting information stored in an auxiliary storage illustrated in FIG. 4.
FIG. 8 illustrates an example of operation-mode setting information stored in the auxiliary storage illustrated in FIG. 4.
FIG. 9 illustrates an example of a state diagram according to Embodiment 1.

As illustrated in FIG. 7, the group setting information 123 includes a remote module address indicating the address of each remote module 400, a model name of the remote module 400, and identification information about the group to which the remote module 400 belongs in association with each other. The group setting information 123 illustrated in FIG. 7 indicates that the remote modules 400A and 400C are assigned to a group I and the remote modules 400B and 400D are assigned to a group II in accordance with the configuration in FIG. 1. In the present embodiment, the remote modules 400 belonging to the group I are the same as the remote modules 400 belonging to the group GRa in FIG. 1, and the remote modules 400 belonging to the group II are the same as the remote modules 400 belonging to group GRb in FIG. 1.

The group setter 114 instructs the storage 430 in each remote module 400 to set the module number based on information input from the inputter 106. In response to the instruction, the controller 410 in each remote module 400 updates the module number 431 stored in the storage 430.

The operation mode setter 115 sets the operation mode for each group. The user operates the inputter 106 to input each group and the operation mode to be set for the remote modules 400 belonging to the group. As illustrated in FIG. 8, the operation mode setter 115 sets the input operation-mode setting information 124 with the auxiliary storage 104 and for the remote modules 400 belonging to the specified group. In the operation-mode setting information 124 illustrated in FIG. 8, the start assisting mode is set for the group I, and the normal mode is set for the group II in accordance with the configuration in FIG. 1. The operation mode setter 115 is an example of operation-mode setting means. The operation mode setting means sets, for each of multiple groups, the operation mode of the remote modules belonging to the group, and sets, for at least one group of the multiple groups, the operation mode of the remote modules belonging to the at least one group to a first operation mode for checking the operation of the remote modules.

The display image former 116 creates a state diagram based on the group setting information 123, the operation-mode setting information 124, and the network information 125 and displays the state diagram on the display 105. The state diagram is an information diagram indicating the connection relationship between the master module 300 and each remote module 400, the grouping of the remote modules, and the setting of the operation mode for each group. The state diagram shows the connection relationship indicated by the network information acquired by the network information acquirer 117 (described later), the group set by the group setter 114, and the operation mode set by the operation mode setter 115 in association with one another. The display image former 116 forms an image that associates, for each remote module 400 for which the operation mode is set, (i) a result of an operation by each channel in the remote module 400 that is performed based on the module parameter information 126 and (ii) a corresponding channel number in the remote module 400. This image can be displayed as a setting screen DS1 (described later). The display image former 116 is an example of display image forming means. The display image forming means forms an image displaying, for each group, information about the remote modules belonging to the group and displaying the operation of the remote modules belonging to a group set to the first operation mode, and forms an image displaying the channels in each remote module belonging to the group and performance results that are results of performance in the first operation mode in association with each other.

FIG. 9 illustrates an example of a state diagram. In accordance with the configuration of FIG. 1, this state diagram indicates that i) the remote modules 400A and 400B are connected to the master module 300, the remote module 400C is subordinate to the remote module 400A, and the remote module 400D is subordinate to the remote module 400B, ii) the remote modules 400A and 400C are assigned to the group I and the remote modules 400B and 400D are assigned to the group II, and iii) the group I is set to the start assisting mode and the group II is set to the normal mode.

The network information acquirer 117 receives network information from the engineering tool 110 through an engineering tool I/F 108 or a software interface between the engineering tool 110 and the start assist tool 120, and registers the network information 125 in the auxiliary storage 104. The network information 125 indicates the connection relationship between the remote modules 400 and the connection relationship between the master module 300 and each remote module 400. In the configuration in FIG. 1, the network information 125 indicates that the remote modules 400A and 400B are connected to the master module 300, that the remote module 400C is subordinate to the remote module 400A, and that the remote module 400D is subordinate to the remote module 400B. The network information acquirer 117 is an example of network information acquisition means. The network information acquisition means acquires network information indicating the connection relationship between the remote modules and between each remote module and the host device that communicates with the remote module.

The transmission/reception setter 118 sets, with each remote module 400, the module parameter information 126 stored in the auxiliary storage 104 for each group. The transmission/reception setter 118 is an example of parameter setting means. The parameter setting means sets, with each remote module, module parameter information that defines the operation of the remote module.

The display 105 displays a start assisting setting screen. The inputter 106 inputs control information and communicates with the CPU module 200 through the communication I/F 107.

Figure 10:
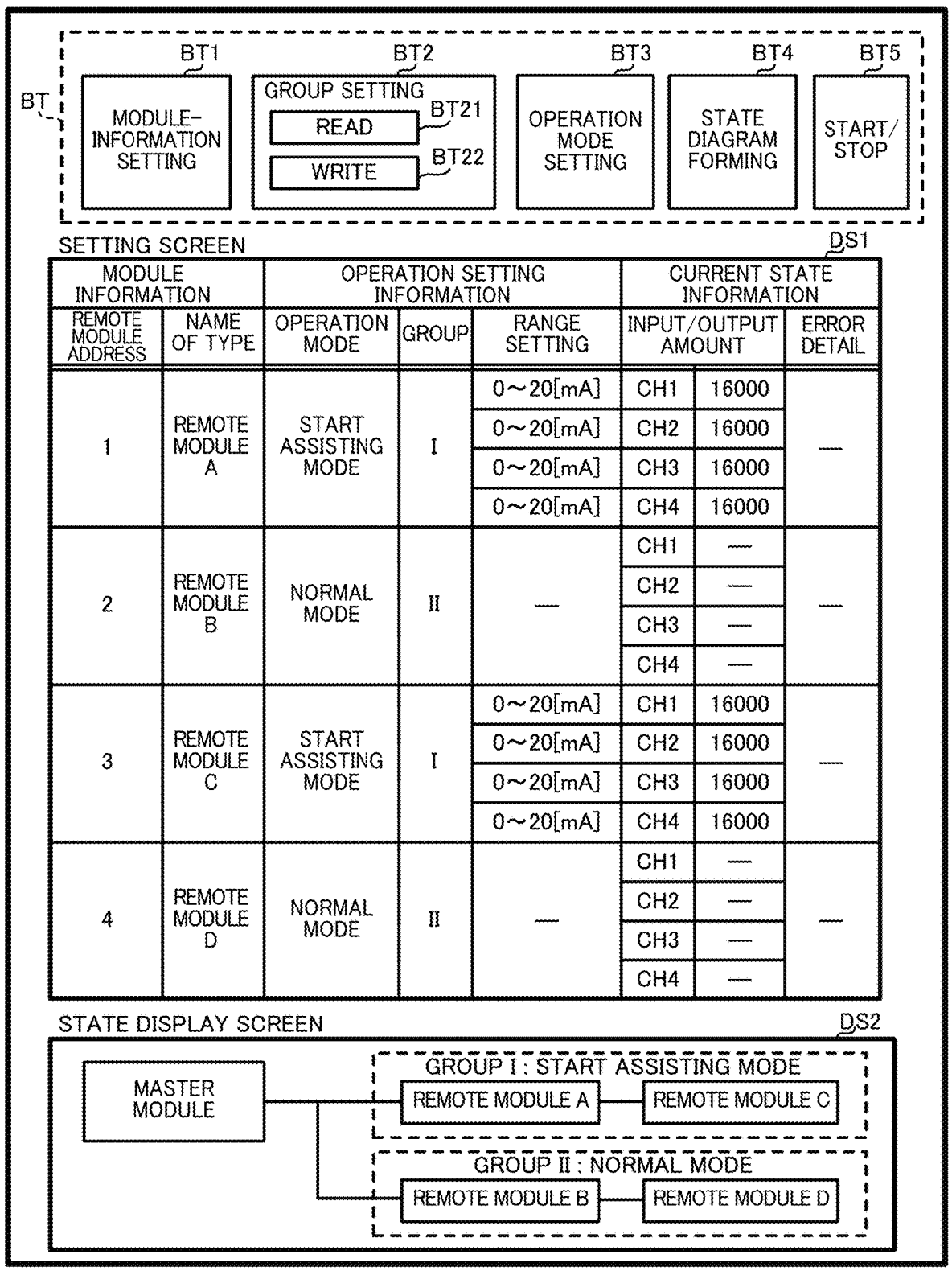
FIG. 10 illustrates an example of an operation screen of the start assist tool illustrated in FIG. 1.

The display image former 116 forms a screen illustrated in FIG. 10 as an operation screen of the start assist tool 120 and displays the screen on the display 105.

This operation screen includes an operation button set BT, a setting screen DS1, and a state display screen DS2.

The operation button set BT includes a module-information setting button BT1, a group setting button BT2 including a group read button BT21 and a group write button BT22, an operation-mode setting button BT3, a state-diagram creating button BT4, and a start/stop button BT5.

The module-information setting button BT1 instructs the network information acquirer 117 to acquire module information about each remote module 400 set by the engineering tool 110 and network information indicating the connection relationship between the master module 300 and the remote module 400. In response to the operation on this button, the network information acquirer 117 reads the network information 121 held by the engineering tool 110 through the engineering tool I/F 108 and stores the network information 121 as the network information 125 into the auxiliary storage 104.

The group read button BT21 instructs the group setter 114 to read and collect group information from each remote module 400. In response to the operation on this button, the group setter 114 acquires the module number 431 set with the storage 430 in each remote module 400 through the CPU module 200 and the master module 300, and stores the module number 431 into the auxiliary storage 104 as the group setting information 123 as illustrated in FIG. 7. The display image former 116 reflects the group setting information 123 on the setting screen DS1 and the state display screen DS2.

The group write button BT22 instructs the group setter 114 to write group information in each remote module 400 and to update the group configuration. When a user inputs the remote module 400 and the module number 431 of the remote module 400 through the inputter 106, the group setter 114 communicates with the specified remote module 400 through the CPU module 200 and the master module 300, writes a new module number 431 specified by the user on the module number 431 stored in the storage 430 in the remote module 400, and updates the module number 431. The group setter 114 also updates the group setting information 123 stored in the auxiliary storage 104.

The operation-mode setting button BT3 instructs the operation mode setter 115 to set the operation mode for each group. In response to the operation on this button, the operation mode setter 115 updates, for each group, the operation mode flag 441 registered in the memory 440 in each of the remote modules 400 belonging to the group. The user specifies the operation mode to be set for the group and the remote modules 400 belonging to the group through the inputter 106. The operation mode setter 115 accesses each remote module 400 through the CPU module 200 and the master module 300 in accordance with the specified operation mode, and updates the operation mode flag 441. The operation mode setter 115 updates the operation-mode setting information 124 stored in the auxiliary storage 104.

The state-diagram creating button BT4 instructs the display image former 116 to create a state diagram indicating the system configuration illustrated in FIG. 9. In response to this instruction, the display image former 116 creates the state diagram illustrated in FIG. 9 and displays the state diagram on the display 105.

The start/stop button BT5 instructs to start and stop processing each remote module 400 set to the start assisting mode. The transmission/reception setter 118 starts, in response to the start instruction, setting the module parameter information 126 stored in the auxiliary storage 104 with each remote module 400 set to the start assisting mode, and stops the processing with the stop instruction.

The setting screen DS1 includes module information identifying each remote module 400, operation setting information indicating the operation settings of the remote module 400, and current state information indicating the current input/output state of the remote module. The setting screen DS1 is an example of an image formed by the display image former 116.

The module information includes the remote module address and the model name of each remote module 400. The operation setting information includes the operation mode set for the remote module 400, the group to which the remote module 400 belongs, and the range setting indicating the range of the current value and the voltage value of each channel CH. The range setting on the setting screen DS1 illustrated in FIG. 10 simply illustrates the range of each channel CH for the current value. The range setting included in the operation setting information is displayed as module parameter information set with each remote module 400. The current state information includes the current input/output amount of each channel CH in the remote module 400 and error details indicating an error code corresponding to an error. The input/output amount and the error details are displayed as performance results that are results of performance by the remote module 400 in the operation mode.

The state display screen DS2 displays a state diagram indicating the system configuration illustrated in FIG. 9.

The processing performed by a user restarting each remote module 400 with the start assist tool 120 is described.

The user first operates the inputter 106 to input an instruction to display the operation screen illustrated in FIG. 10 on the display 105.

The display image former 116 forms the operation screen illustrated in FIG. 10 based on the group setting information 123, the operation-mode setting information 124, the network information 125, and the module parameter information 126 stored in the auxiliary storage 104, and displays the operation screen on the display 105.

The user operates the module-information setting button BT1 on the setting screen DS1 to cause the network information acquirer 117 to acquire the latest network information 121 held by the engineering tool 110. The network information acquirer 117 updates the network information 125 stored in the auxiliary storage 104, and the display image former 116 updates the display on the setting screen DS1.

The user then operates the group read button BT21 to cause the group setter 114 to update the group setting information 123. The group setter 114 updates the group setting information 123 stored in the auxiliary storage 104 based on the module number acquired from each remote module 400. The display image former 116 updates the display on the setting screen DS1.

The user operates the operation-mode setting button BT3 to add any change to the setting information displayed on the operation screen to edit the setting information. In response to this operation, the display image former 116 receives the operation on data on the operation screen through the inputter 106. For example, the user sets the operation mode for each group. As appropriate, the module parameter information 126 including the setting of the current range for each channel CH is set with each remote module 400 set to the start assisting mode. The display image former 116 and the inputter 106 are examples of parameter setting means and editing means. The editing means receives editing of the module parameter information displayed on the setting screen. More specifically, the editing means is used by a user to edit the module parameter information. As appropriate, the parameter setting means sets, with the remote modules 400 set to the start assisting mode, the module parameter information edited with the editing means, that is, the module parameter information edited by the user through the editing means. Instead of the display image former 116, the transmission/reception setter 118 may function as the parameter setting means. The display image former 116 and the transmission/reception setter 118 may integrally function as the parameter setting means.

As appropriate, the user operates the state-diagram creating button BT4 to create a state diagram. In response to the operation on this button, the display image former 116 creates a state diagram based on the latest information and updates the state diagram on the operation screen.

When the start/stop button BT5 is operated finally, the transmission/reception setter 118 transmits, to the corresponding remote module 400, a setting value set on the setting screen DS1 for the corresponding one of the remote modules 400 set to the start assisting mode. The controller 410 in each remote module 400 belonging to the group set to the start assisting mode sets the transmitted setting value with the corresponding portion. For example, when receiving setting information about the current range, the controller 410 sets the instructed current range with each channel CH.

Figure 11:
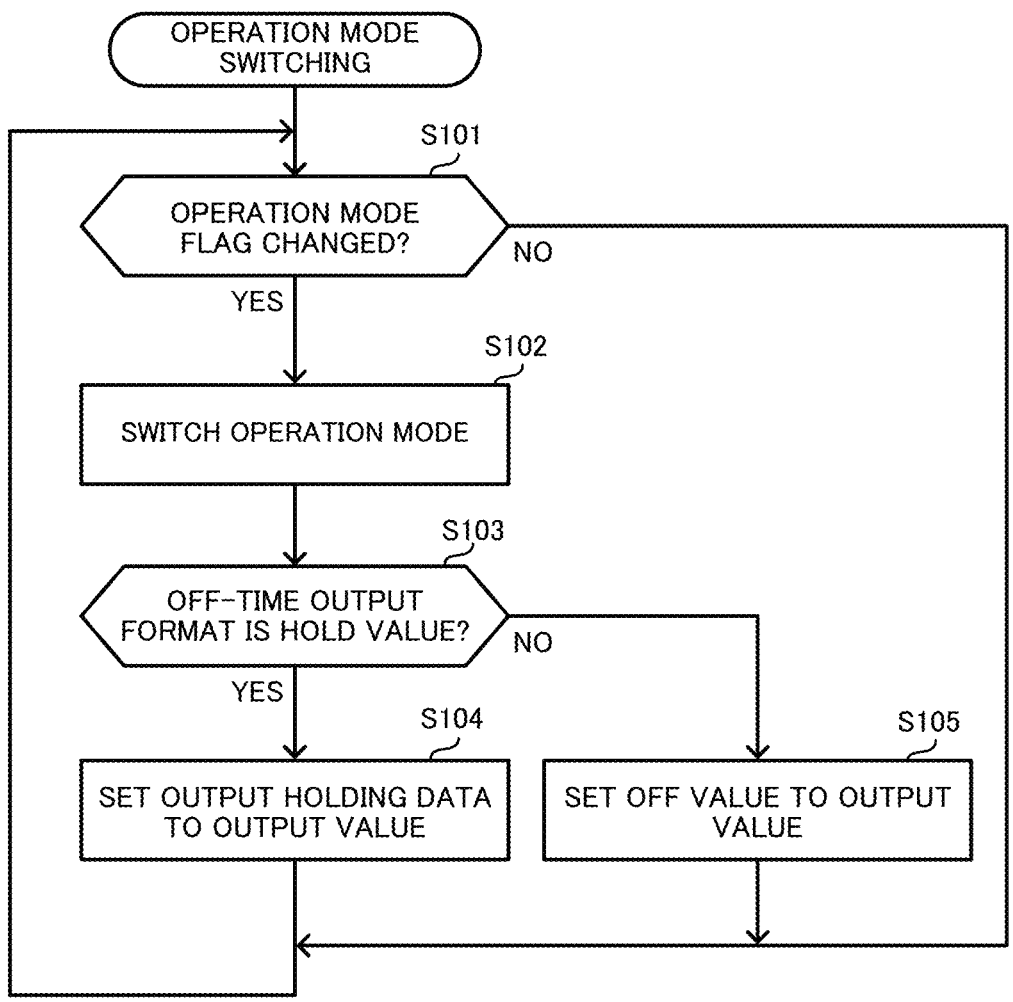
FIG. 11 is a flowchart of operation performed by a remote module to switch the operation mode according to Embodiment 1.

The operation of the remote module 400 that has received an instruction from the start assist tool 120 is described with reference to FIG. 11 illustrating a case in which notification of switching of the operation mode is sent.

The controller 410 in each remote module 400 periodically monitors the operation mode flag 441 (step S101). When the controller 410 determines that the operation mode flag 441 is changed (Yes in step S101), the controller 410 switches the operation mode between the normal mode 411 and the start assisting mode 412 in accordance with the operation mode flag 441 (step S102). When the operation mode flag 441 is thus updated, the remote module 400 sets the operation mode specified by the updated operation mode flag 441 as the operation mode of the remote module 400.

For the remote module 400 serving as an output module, when the output values are suddenly turned off during the operation mode switching, the production line device 500 may perform an unintended operation. Thus, the controller 410 reads the off-time output format 443 stored in the memory 440 and determines whether the output format is a hold value (step S103).

When a hold value is set as the off-time output format (Yes in step S103), the controller 410 holds the preceding output value held as the output-value holding data 442 (step S104). When a hold value is not set as the off-time output format (No in step S103), the controller 410 sets an off value, such as an open state for breaking the electrical connection, as the output value (step S105).

The remote module 400 to which the start assisting mode 412 is set in this manner as the operation mode of the controller 410 receives the setting and the update of the operation parameters for each group set by the start assist tool 120, and performs the corresponding settings. For example, the remote module 400 sets the current range for each channel CH to the instructed value.

The remote module 400 to which the normal mode 411 is set as the operation mode is individually specified with the engineering tool 110 and receives the setting and the update of the module parameter information 122.

In the present embodiment, the multiple remote modules 400 can be collectively divided into groups, and the operation mode for the remote modules 400 belonging to each of the groups can be changed by each group or the program and the parameters can be set by each group. The operations of the remote modules 400 can be collectively checked by displaying the operations of the remote modules 400 in accordance with the set parameter for each group. This structure can thus simplify the work to start or change the production line.

Embodiment 2

A production system according to Embodiment 2 of the present disclosure is described. A method according to the present embodiment includes virtually operating multiple remote modules set to the start assisting mode as a single module to control the remote modules by handling the remote modules as a single module. To start a large-scale production line including a large number of production lines, for example, multiple production lines each including multiple remote modules 400 that communicate with the CPU module 200 may be started one by one. When the control program 210 in the CPU module 200 connected to the multiple remote modules 400 to communicate with the remote modules 400 is changed, the CPU module 200 is to be rebooted. More specifically, a change in the number of remote modules 400 or a change in the devices to be used involves a change in the control program 210 and rebooting of the CPU module 200. The CPU module 200 being rebooted can stop all the remote modules 400 in operation or cause other issues. In addition to the starting of a production line, replacement of the remote modules 400 or an increase or decrease in the number of remote modules 400 to be used in a later change in the production line can also cause similar issues.

Figure 12:
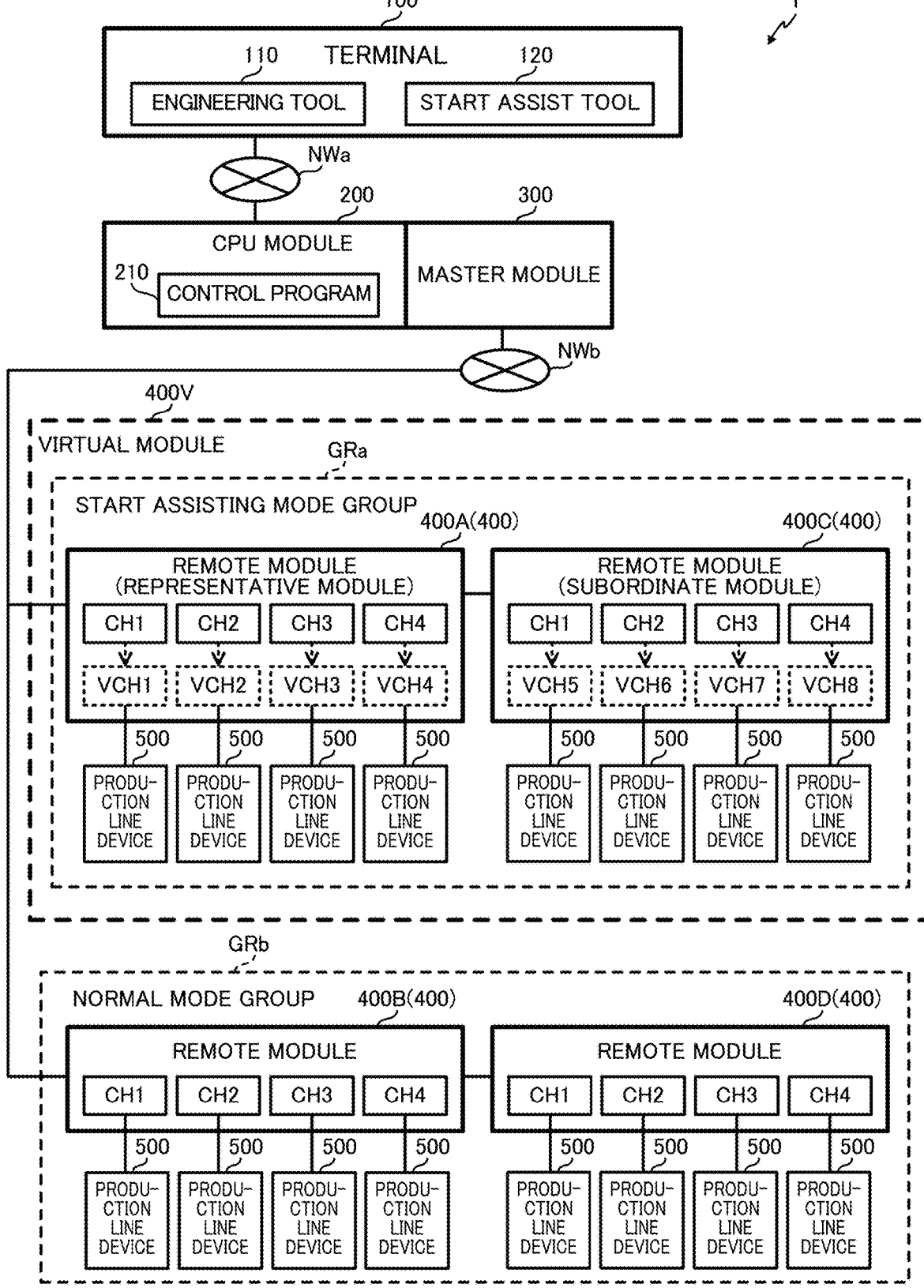
FIG. 12 illustrates configuration of a PLC system according to Embodiment 2 of the present disclosure.

FIG. 12 is a block diagram of the system according to the present embodiment. The basic configuration of the PLC system 1 according to the present embodiment is the same as the configuration in Embodiment 1. In this configuration, the remote modules 400 to which the start assisting mode is set are set as a virtual module 400V that virtually operates as a single remote module with eight channels. The virtual module 400V includes a representative module 400A connected to the master module 300 and a subordinate module 400C. When the start assist tool 120 sets the operation mode of the virtual module 400V to the start assisting mode, each remote module 400 included in the virtual module 400V operates as the representative module 400A or the subordinate module 400C.

With this operation, the start assist tool 120 sets the operation parameter with the representative module 400A to cause channels CH1 to CH4 included in the representative module 400A to appear as channels VCH1 to VCH4 in the virtual module 400V, and sets the operation parameter with the subordinate module 400C to cause channels CH1 to CH4 included in the subordinate module 400C to appear as channels VCH5 to VCH8 in the virtual module 400V.

The virtual module 400V controls the production line devices 500 through the virtual channels VCH1 to VCH8.

The CPU module 200 and the master module 300 handle the representative module 400A and the subordinate module 400C as a single remote module including eight virtual channels VCH1 to VCH8. Thus, the start assist tool 120 sets one of the serially connected remote modules 400 as a representative module. The other remote modules 400 are automatically set as subordinate modules. In the example described below, the remote module 400A is handled as a representative module.

The representative module 400A determines whether the data received from the master module 300 is to be processed by the representative module 400A or by the subordinate module 400C. When determining that the data is to be processed by the representative module 400A, the representative module 400A processes the data. When determining that the data is to be processed by the subordinate module 400C, the representative module 400A converts the number of the virtual channel instructed by the master module 300 to the channel number of the subordinate module, and provides the data to the subordinate module 400C.

More specifically, the virtual module 400V in this example is an output module that outputs the current and the voltage to the production line devices 500 through the virtual channels VCH1 to VCH8. The master module 300 transmits the output value data indicating the current and the voltage for the virtual channels VCH1 to VCH8 in the virtual module 400V to the representative module 400A. The representative module 400A outputs the current and the voltage based on the output value data for the virtual channels VCH1 to VCH4 in the received output value data through the channels CH1 to CH4 in the representative module 400A.

The representative module 400A determines that the output value data indicating the current and the voltage for the virtual channels VCH5 to VCH8 is to be processed by the subordinate module 400C. The representative module 400A transmits the output value data for the virtual channels VCH5 to VCH8 to the subordinate module 400C with information indicating that the virtual channels VCH5 to VCH8 correspond to the channels CH1 to CH4 in the subordinate module 400C. The subordinate module 400C outputs the current and the voltage based on the provided output value data for the virtual channels VCH5 to VCH8 from the channels CH1 to CH4 in the subordinate module 400C.

When the virtual module 400V serves as an input module, the subordinate module 400C transmits input value data indicating the current and the voltage provided to the channels CH1 to CH4 in the subordinate module 400C to the representative module 400A together with the channel numbers. The representative module 400A transmits, to the master module 300, the input value data indicating the current and the voltage provided to the channels CH1 to CH4 in the representative module 400A as input value data provided to the virtual channels VCH1 to VCH4, and the data provided to the channels CH1 to CH4 in the subordinate module 400C as input value data provided to the virtual channels VCH5 to VCH8.

Figure 13:
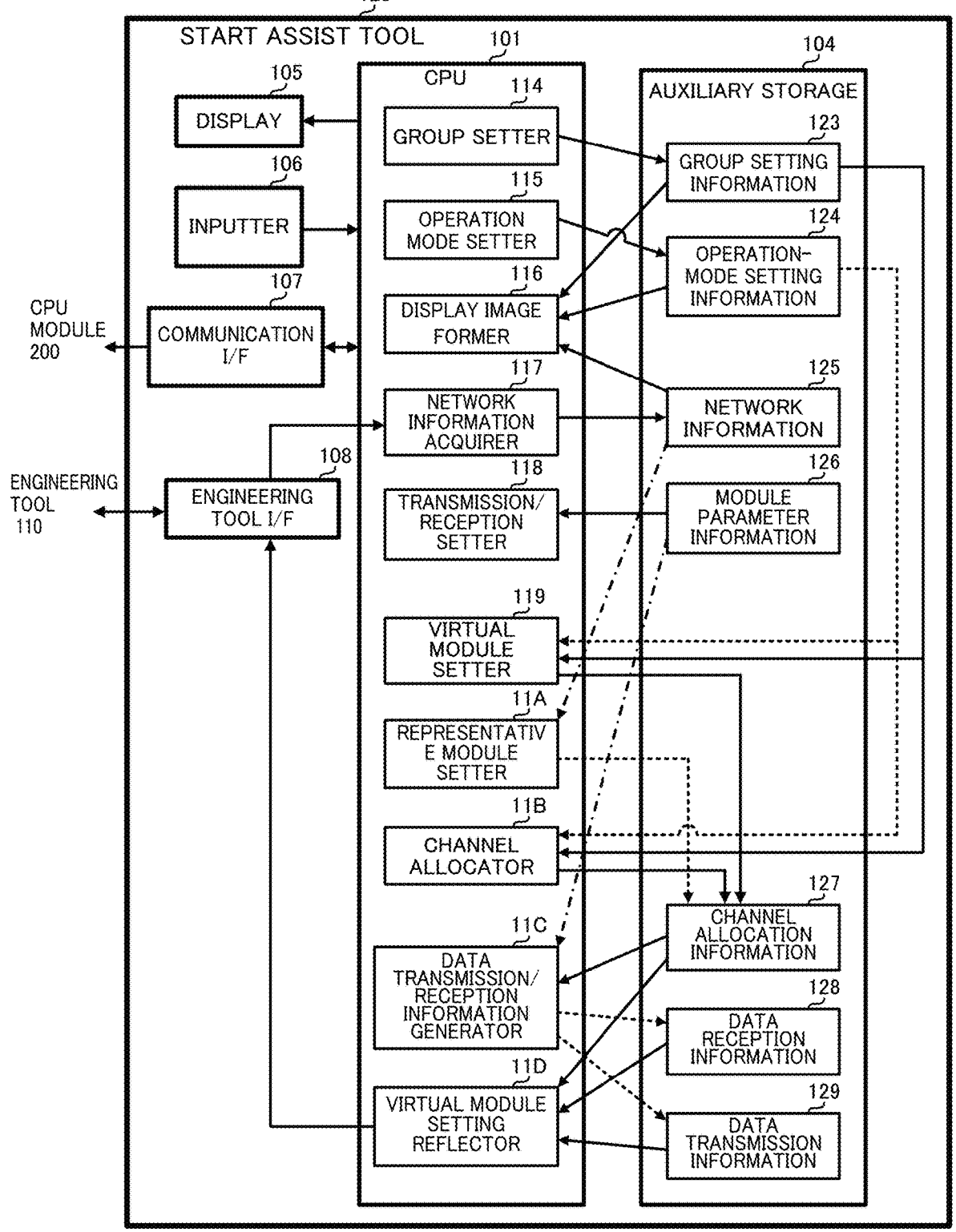
FIG. 13 illustrates configuration of a start assist tool in Embodiment 2.

FIG. 13 is a block diagram of the start assist tool 120 used in Embodiment 2. As illustrated in FIG. 13, in addition to the configuration in FIG. 6, the auxiliary storage 104 in the start assist tool 120 according to Embodiment 2 stores channel allocation information 127, data reception information 128, and data transmission information 129. The CPU 101 includes a virtual module setter 119, a representative module setter 11A, a channel allocator 11B, a data transmission/reception information generator 11C, and a virtual module setting reflector 11D.

Figure 14:
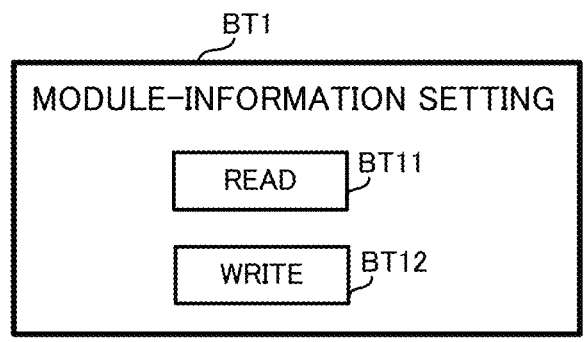
FIG. 14 illustrates an example of buttons displayed on an operation screen according to Embodiment 2.

As illustrated in FIG. 14, in the present embodiment, the module-information setting button BT1 on the setting screen includes a module-information read button BT11 and a module-information write button BT12. The module-information read button BT11 has the same function as the module-information setting button BT1 in Embodiment 1, or specifically, the module-information read button BT11 instructs to read the module information about each remote module 400 and the network information indicating the connection relationship between the master module 300 and each remote module 400. The module-information write button BT12 instructs the remote module 400 set by the start assist tool 120 to operate as a virtual module.

The virtual module setter 119 sets the groups divided in the above manner as the virtual module 400V. In response to the operation on the module-information write button BT12, the operation parameter to be set for the virtual module 400V set to the start assisting mode is set for the corresponding remote modules 400. The remote modules 400 belonging to the group GRa are set as the virtual module 400V. The virtual module setter 119 is an example of virtual module setting means. The virtual module setting means sets one or more groups of the groups set by the group setting means as a virtual module. Based on the network information 125, the representative module setter 11A automatically sets the remote module 400 connected to the master module 300 as a representative module and the remaining remote modules 400 as subordinate modules. The representative module setter 11A is an example of representative module setting means. The representative module setting means sets one of the remote modules belonging to the virtual module as a representative module that transmits and receives data to and from a host device that communicates with the virtual module. The master module 300 corresponds to an example of the host device that communicates with the virtual module.

The channel allocator 11B automatically generates the channel allocation information 127 from the group setting information 123 and the operation-mode setting information 124. FIG. 15 illustrates an example of the generated channel allocation information 127. As illustrated, the channels in the virtual module 400V are associated with the model name of each remote module included in the virtual module 400V, the channel in the remote module, and the remote address of the remote module. Information specifying the representative module is also included. The channel allocator 11B is an example of channel allocation means. The channel allocation means allocates channels in the virtual module to the channels in the remote module included in the virtual module.

The data transmission/reception information generator 11C automatically generates the data reception information 128 and the data transmission information 129 to form the virtual module 400V. FIG. 16 illustrates an example of the data reception information 128, and FIG. 17 illustrates an example of the data transmission information 129.

The virtual module setting reflector 11D reflects, on the engineering tool 110, the setting data that causes the remote module 400 to operate as the virtual module 400V. More specifically, the virtual module setting reflector 11D sends notification of the channel allocation information 127, the module parameter information 126, the data reception information 128, and the data transmission information 129 from the engineering tool I/F 108. This notification is transmitted to the engineering tool 110. The virtual module setting reflector 11D is an example of virtual module setting reflection means. The virtual module setting reflection means reflects, to the remote modules set to the second operation mode different from the first operation mode, the module parameter information and the channel allocation information indicating at least a correspondence relationship between the channels in the virtual module and the channels in the remote modules belonging to the group included in the virtual module. The engineering tool I/F 108 is an example of notification means. The notification means sends notification of the channel allocation information and the module parameter information to a tool that sets the module parameter information about the remote modules set to the second operation mode.

The remote module 400 set to the start assisting mode can be automatically set as the virtual module 400V as described above. With this virtual module 400V, the multiple remote modules 400 can be virtually handled as a single module. The CPU module 200 thus finds no change in the single remote module regardless of an increase or decrease in the number of remote modules 400 or replacement of the remote modules 400 in the virtual module 400V. This eliminates a change in the control program and rebooting of the CPU module 200. This structure can thus simplify the work to start or change the production line.

As described above, in the present embodiment, each group can be set to the start assisting mode to form a virtual module. This structure reduces and facilitates the process of forming a virtual module compared with the structure in which a user individually sets setting information for forming a virtual module with each remote module.

The start assist tool 120 sends notification of the channel allocation information 127, the module parameter information 126, the data reception information 128, and the data transmission information 129 to the engineering tool 110. The setting information about the virtual module usable by the start assist tool 120 is transferred to the engineering tool 110. Thus, the virtual module can be easily handled using the engineering tool 110 after the production line starts the operation with the setting similar to the setting usable by the start assist tool 120 to start or change the production line.

In Embodiment 1 described above, the remote modules 400 are classified into two groups GRa and GRb, but may be classified into three or more groups. Each of the groups GRa and GRb may include one, three, or more remote modules 400. Each group may include the same or a different number of remote modules 400. When, for example, the remote modules 400 are classified into five groups, the operation mode setter 115 may set the first operation mode for three of the five groups, and the operation mode different from the first operation mode for the remaining two groups. In other words, the operation mode setter 115 can set the operation mode for the remote modules 400 belonging to at least one group.

In Embodiment 2 described above, the group GRa including two remote modules 400 is used as the virtual module 400V, but the virtual module 400V may include three or more remote modules 400. The virtual module 400V may include multiple groups.

The functions of the terminal 100 can be implementable by dedicated hardware or a common computer system.

For example, the program executed by the CPU 101 may be stored in a non-transitory computer-readable recording medium for distribution. The program is installed in a computer to provide a device that performs the above processing. Examples of such a non-transitory recording medium include a flexible disk, a compact disc read-only memory (CD-ROM), a digital versatile disc (DVD), and a magneto-optical (MO) disk.

The program may be stored in a disk device included in a server on a communication network, typically the Internet, and may be, for example, superimposed on a carrier wave to be downloaded to a computer.

The processing described above may also be performed by the program being activated and executed while being transferred through a communication network.

The processing described above may also be performed by the program being entirely or partially executed on a server with a computer transmitting and receiving information about the processing through a communication network.

In the system with the above functions implementable partly by the operating system (OS) or through cooperation between the OS and applications, portions executable by applications other than the OS may be stored in a non-transitory recording medium that may be distributed or may be downloaded to the computer.

Means for implementing the functions of the terminal 100 is not limited to software. The functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

As described above, a control method according to the present disclosure is applicable to a collective operation check to start a production line with multiple remote modules.

REFERENCE SIGNS LIST

1 PLC system
100 Terminal
101 CPU
102 ROM
103 RAM
104 Auxiliary storage
105 Display
106 Inputter
107 Communication I/F
108 Engineering tool I/F
110 Engineering tool
111 Operation mode setter
112 Network information setter
113 Transmission/reception setter
114 Group setter
115 Operation mode setter
116 Display image former
117 Network information acquirer
118 Transmission/reception setter
119 Virtual module setter
11A Representative module setter
11B Channel allocator
11C Data transmission/reception information generator
11D Virtual module setting reflector
121 Network information
122 Module parameter information
123 Group setting information
124 Operation-mode setting information
125 Network information
126 Module parameter information
127 Channel allocation information
128 Data reception information
129 Data transmission information
120 Start assist tool
200 CPU module
20 Processor
21 External bus I/F
22 PC I/F
23 Storage
24 Memory
25 Internal bus
210 Control program
300 Master module
30 Processor
31 External bus I/F
32 Storage
33 Memory
34 Network I/F
35 Internal bus
400, 400A to 400D Remote module
400V Virtual module
410 Controller
411 Normal mode
412 Start assisting mode
420 Network I/F
430 Storage
431 Module number
440 Memory
441 Operation mode flag
442 Output-value holding data
443 Off-time output format
450 Channel selector
45 Internal bus
500 Production line device
BL Bus
BT Operation button set
BT1 Module-information setting button
BT11 Module-information read button
BT12 Module-information write button
BT2 Group setting button
BT21 Group read button
BT22 Group write button
BT3 Operation-mode setting button
BT4 State-diagram creating button
BT5 Start/stop button
CP Communication path
CH, CH1 to CH4 Channel
DS1 Setting screen
DS2 State display screen
GRa, GRb Group
NWa, NWb Network
VCH Virtual channel

The invention claimed is:

1. A production assisting device comprising:
an information collector to collect, from a plurality of remote modules each at least to input or output a signal through channels connected to control target devices, module identification information for classification of the plurality of remote modules into a plurality of groups;
a group setter to set the plurality of groups using the module identification information collected by the information collector;
an operation mode setter to set, for each of the plurality of groups, an operation mode of a remote module belonging to the group, and to set, for at least one group of the plurality of groups, an operation mode of a remote module belonging to the at least one group to a first operation mode for checking an operation of the remote module belonging to the at least one group; and
a display image former to form an image displaying, for each of the plurality of groups, information about the remote module belonging to the group, the image displaying the operation of the remote module belonging to the at least one group and set to the first operation mode.

2. The production assisting device according to claim 1, wherein
the display image former forms an image displaying channels in the remote module belonging to the at least one group and performance results that are results of performance in the first operation mode in association with each other.

3. The production assisting device according to claim 1, further comprising:
a network information acquirer to acquire network information indicating a connection relationship between the plurality of remote modules and between each of the plurality of remote modules and a host device for communication with the remote module, wherein
the display image former creates a state diagram displaying the connection relationship indicated by the network information acquired by the network information acquirer, the plurality of groups set by the group setter, and the operation mode set by the operation mode setter in association with one another.

4. The production assisting device according to claim 1, further comprising:
a parameter setter to set, with each of the plurality of remote modules, module parameter information defining an operation of the remote module; and
an editor to receive editing of the module parameter information, wherein
the display image former forms a setting screen displaying the module parameter information set with the remote module belonging to the at least one group,
the editor receives editing of the module parameter information displayed on the setting screen, and
the parameter setter sets the module parameter information edited with the editor with the remote module belonging to the at least one group.

5. The production assisting device according to claim 4, further comprising:
a virtual module setter to set one or more groups of the plurality of groups set by the group setter as a virtual module;
a representative module setter to set one of remote modules belonging to the virtual module as a representative module to transmit and receive data to and from a host device for communication with the virtual module;
a channel allocator to allocate channels in the virtual module to channels in the remote modules included in the virtual module;
a virtual module setting reflector to reflect, to a remote module set to a second operation mode different from the first operation mode, the module parameter information and channel allocation information indicating at least a correspondence relationship between the channels in the virtual module and the channels in the remote modules belonging to the one or more groups included in the virtual module; and
a notifier to send notification of the channel allocation information and the module parameter information to a tool for setting the module parameter information about the remote module set to the second operation mode.

6. The production assisting device according to claim 1, further comprising:
a virtual module setter to set one or more groups of the plurality of groups set by the group setter as a virtual module;
a representative module setter to set one remote module of at least one remote module belonging to the virtual module as a representative module to transmit and receive data to and from a host device for communication with the virtual module; and
a channel allocator to allocate channels in the virtual module to channels in the at least one remote module included in the virtual module.

7. A production system comprising:
a plurality of remote modules each at least to input or output a signal through channels connected to control target devices; and
a production assisting device to connect to the plurality of remote modules, wherein
the production assisting device includes
an information collector to collect, from the plurality of remote modules, module identification information for classification of the plurality of remote modules into a plurality of groups,
a group setter to set the plurality of groups using the module identification information collected by the information collector,
an operation mode setter to set, for each of the plurality of groups, an operation mode of a remote module belonging to the group, and to set, for at least one group of the plurality of groups, an operation mode of a remote module belonging to the at least one group to a first operation mode for checking an operation of the remote module belonging to the at least one group, and
a display image former to form an image displaying, for each of the plurality of groups, information about the remote module belonging to the group, the image displaying the operation of the remote module belonging to the at least one group and set to the first operation mode.

8. The production system according to claim 7, wherein each of the plurality of remote modules monitors operation mode information specifying the operation mode, and sets, when the operation mode information is updated, an operation mode specified by the updated operation mode information as the operation mode of the remote module.

9. A non-transitory recording medium storing a program for causing a computer to function as:
an information collector to collect, from a plurality of remote modules each at least to input or output a signal through channels connected to control target devices, module identification information for classification of the plurality of remote modules into a plurality of groups;
a group setter to set the plurality of groups using the module identification information collected by the information collector;
an operation mode setter to set, for each of the plurality of groups, an operation mode of a remote module belonging to the group, and to set, for at least one group of the plurality of groups, an operation mode of a remote module belonging to the at least one group to a first operation mode for checking an operation of the remote module belonging to the at least one group; and
a display image former to form an image displaying, for each of the plurality of groups, information about the remote module belonging to the group, the image displaying the operation of the remote module belonging to the at least one group and set to the first operation mode.

10. A production assisting device comprising:
processing circuitry configured
to collect, from a plurality of remote modules each at least to input or output a signal through channels connected to control target devices, module identification information for classification of the plurality of remote modules into a plurality of groups;
to set the plurality of groups using the collected module identification information;
to set, for each of the plurality of groups, an operation mode of a remote module belonging to the group, and to set, for at least one group of the plurality of groups, an operation mode of a remote module belonging to the at least one group to a first operation mode for checking an operation of the remote module belonging to the at least one group; and
to form an image displaying, for each of the plurality of groups, information about the remote module belonging to the group, the image displaying the operation of the remote module belonging to the at least one group and set to the first operation mode.

11. The production assisting device according to claim 10, wherein
the processing circuitry is further configured to form an image displaying channels in the remote module belonging to the at least one group and performance results that are results of performance in the first operation mode in association with each other.

12. The production assisting device according to claim 10, wherein:
the processing circuitry is further configured to acquire network information indicating a connection relationship between the plurality of remote modules and between each of the plurality of remote modules and a host device for communication with the remote module, and
the processing circuitry is further configured to create a state diagram displaying the connection relationship indicated by the acquired network information, the set plurality of groups, and the set operation mode in association with one another.

13. The production assisting device according to claim 10, wherein:
the processing circuitry is further configured to set, with each of the plurality of remote modules, module parameter information defining an operation of the remote module;
the processing circuitry is further configured to receive editing of the module parameter information, wherein
the processing circuitry is configured to form a setting screen displaying the module parameter information set with the remote module belonging to the at least one group,
the processing circuitry receives editing of the module parameter information displayed on the setting screen, and
the processing circuitry sets the edited module parameter information with the remote module belonging to the at least one group.

14. The production assisting device according to claim 13, wherein:
the processing circuitry is further configured to set one or more groups of the set plurality of groups as a virtual module;
the processing circuitry is further configured to set one of remote modules belonging to the virtual module as a representative module to transmit and receive data to and from a host device for communication with the virtual module;
the processing circuitry is further configured to allocate channels in the virtual module to channels in the remote modules included in the virtual module;
the processing circuitry is further configured to reflect, to a remote module set to a second operation mode different from the first operation mode, the module parameter information and channel allocation information indicating at least a correspondence relationship between the channels in the virtual module and the channels in the remote modules belonging to the one or more groups included in the virtual module; and
the processing circuitry is further configured to send notification of the channel allocation information and the module parameter information to a tool for setting the module parameter information about the remote module set to the second operation mode.

15. The production assisting device according to claim 10, wherein:
the processing circuitry is further configured to set one or more groups of the set plurality of groups as a virtual module;
the processing circuitry is further configured to set one remote module of at least one remote module belonging to the virtual module as a representative module to transmit and receive data to and from a host device for communication with the virtual module; and
the processing circuitry is further configured to allocate channels in the virtual module to channels in the at least one remote module included in the virtual module.

16. A production system comprising:
a plurality of remote modules each at least to input or output a signal through channels connected to control target devices; and
a production assisting device to connect to the plurality of remote modules, wherein
the production assisting device includes processing circuitry configured
to collect, from the plurality of remote modules, module identification information for classification of the plurality of remote modules into a plurality of groups,
to set the plurality of groups using the collected module identification information, to set, for each of the plurality of groups, an operation mode of a remote module belonging to the group, and to set, for at least one group of the plurality of groups, an operation mode of a remote module belonging to the at least one group to a first operation mode for checking an operation of the remote module belonging to the at least one group, and
to form an image displaying, for each of the plurality of groups, information about the remote module belonging to the group, the image displaying the operation of the remote module belonging to the at least one group and set to the first operation mode.

17. The production system according to claim 16, wherein each of the plurality of remote modules monitors operation mode information specifying the operation mode, and sets, when the operation mode information is updated, an operation mode specified by the updated operation mode information as the operation mode of the remote module.

* * * * *